(12) United States Patent
Cain et al.

(10) Patent No.: US 7,775,817 B2
(45) Date of Patent: Aug. 17, 2010

(54) ELECTRICAL CONTACTS FOR LEADING EDGE CONTROL SURFACES ON AN AIRCRAFT

(75) Inventors: George Eugene Cain, Corvallis, MT (US); Steven George Mackin, Bellevue, WA (US); Art L. Ma, Everett, WA (US); Emily Jane Yannucci, Seattle, WA (US)

(73) Assignee: The Boeing Company, Chicago, IL (US)

( * ) Notice: Subject to any disclaimer, the term of this patent is extended or adjusted under 35 U.S.C. 154(b) by 41 days.

(21) Appl. No.: 12/204,080

(22) Filed: Sep. 4, 2008

(65) Prior Publication Data

US 2010/0055929 A1    Mar. 4, 2010

(51) Int. Cl.
*H01R 13/53* (2006.01)
(52) U.S. Cl. ...................................... 439/181
(58) Field of Classification Search .................. 439/181, 439/188
See application file for complete search history.

(56) References Cited

U.S. PATENT DOCUMENTS

| | | | |
|---|---|---|---|
| 4,814,737 A | 3/1989 | Ebnet | |
| 6,644,984 B2 | 11/2003 | Vista, Jr. et al. | |
| 6,709,274 B2 | 3/2004 | Lazaro, Jr. et al. | |
| 6,761,570 B2 * | 7/2004 | Patterson et al. | 439/188 |
| 6,793,510 B2 * | 9/2004 | Yamakawa et al. | 439/188 |
| 7,140,897 B2 | 11/2006 | Axenbock et al. | |
| 7,249,735 B2 | 7/2007 | Amorosi et al. | |
| 2006/0038088 A1 | 2/2006 | Dodson | |

* cited by examiner

*Primary Examiner*—Tho D Ta
(74) *Attorney, Agent, or Firm*—Yee & Associates, P.C.; James M. Poole

(57) ABSTRACT

An apparatus comprising a first part, a second part, an electrical contact, and a relay. The second part is movable relative to the first part. The electrical contact is attached to the second part. The electrical contact provides an electrical connection between the first part and the second part when the second part is in a first position and breaks the electrical connection when the second part is in a second position. The relay is electrically connected to the electrical contact.

18 Claims, 8 Drawing Sheets

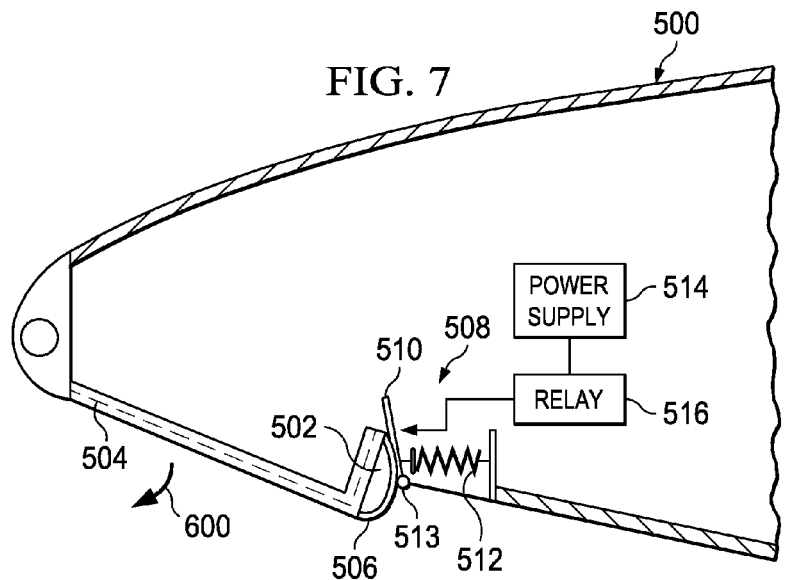
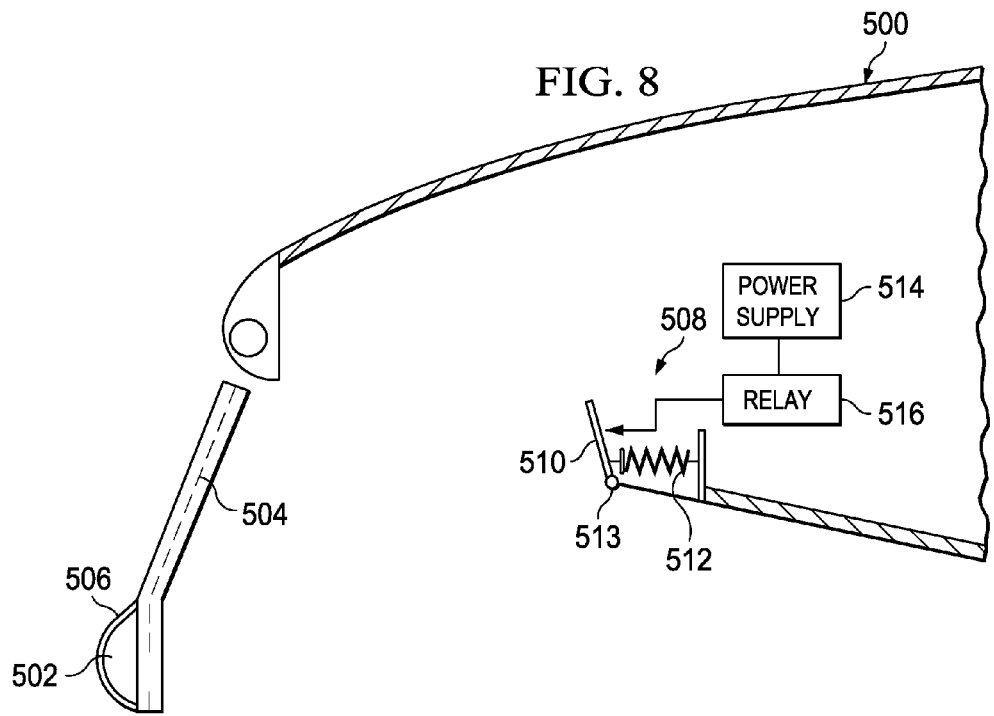

«ELECTRICAL CONTACTS FOR LEADING EDGE CONTROL SURFACES ON AN AIRCRAFT»

BACKGROUND INFORMATION

1. Field

The present disclosure relates generally to aircraft and in particular to a method and apparatus for providing electrical contact in an aircraft. Still more particularly, the present disclosure provides a method and apparatus for providing electrical contact to a control surface on an aircraft.

2. Background

An aircraft has a number of different flight control surfaces that may be used to control an aircraft during takeoff and flight. Examples of control surfaces include ailerons, elevators, rudders, flaps, slats, and airbrakes. These control surfaces are airfoils that deflect air in one direction and cause an aircraft to move in another direction.

With respect to maintaining a smooth flow of air and providing a capability to generate lift, it is important to remove and/or prevent ice from accumulating on aircraft control surfaces. Aircraft may use a number of different mechanisms for preventing and/or removing ice from these control surfaces. For example, electrical mechanical systems may use a mechanical force to knock ice off of a flight surface. Actuators may be installed underneath the skin of the aircraft structure in which the actuator is moved to induce a shockwave in the protected surface to dislodge the ice.

In another type of system, heaters may be used to prevent or remove ice from the surface. These types of heaters are also referred to as electrical thermal systems. With electric heaters, these devices may remove ice and/or may prevent ice from forming on a control surface.

Both electrical thermal systems and electro-mechanical systems require an electrical connection to function. With some control surfaces, supplying an electrical connection may be more challenging. For example, with slats or flaps located on a leading edge of an aircraft, the movement of these control surfaces may require more complex systems to maintain an electrical connection.

Currently, this type of connection may be made using a translating wire bundle. A translating wire bundle is a physical linkage having a number of different links through which cables may run. This type of structure allows for an electrical connection to be maintained to a moving part, while protecting the cables that may be providing the electrical connection. These types of connections increase the weight of an aircraft, take up space within the wing of an aircraft, and also increase the cost of constructing an aircraft.

Therefore, it would be advantageous to have a method and apparatus to provide electrical contacts in a manner that overcomes the problems described above.

SUMMARY

In one advantageous embodiment, an apparatus comprises a first part, a second part, an electrical contact, and a relay. The second part is movable relative to the first part. The electrical contact is attached to the second part. The electrical contact provides an electrical connection between the first part and the second part when the second part is in a first position and breaks the electrical connection when the second part is in a second position. The relay is electrically connected to the electrical contact.

In another advantageous embodiment, an aircraft electrical connection system comprises a wing of an aircraft, a movable part, a heater, and a biased electrical contact. The movable part is on a leading edge of the wing. The heater is located within the movable part. The biased electrical contact is attached to the movable part and provides an electrical connection between the heater and the wing when the movable part is in a first position and maintains the electrical connection when the movable part is in a second position.

In yet another advantageous embodiment, a method is present for providing an electrical connection to moving vehicle parts. Power is sent from a first part to an electrical device located in a second part in a first position through a biased electrical contact. The biased electrical contact provides the electrical connection between the first part and the second part with the second part in the first position and wherein a relay is electrically connected to the biased electrical contact. The second part is moved to a second position, and the biased electrical contact disconnects from the electrical device. The power to the biased electrical contact is disconnected prior to the biased electrical contact being disconnected from the electrical device, wherein electrical arcing is prevented.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 7 is a diagram of a wing in accordance with an advantageous embodiment;

FIG. 8 is a diagram of a Krueger flap in a fully extended position in accordance with an advantageous embodiment;

DETAILED DESCRIPTION

Figure 1:
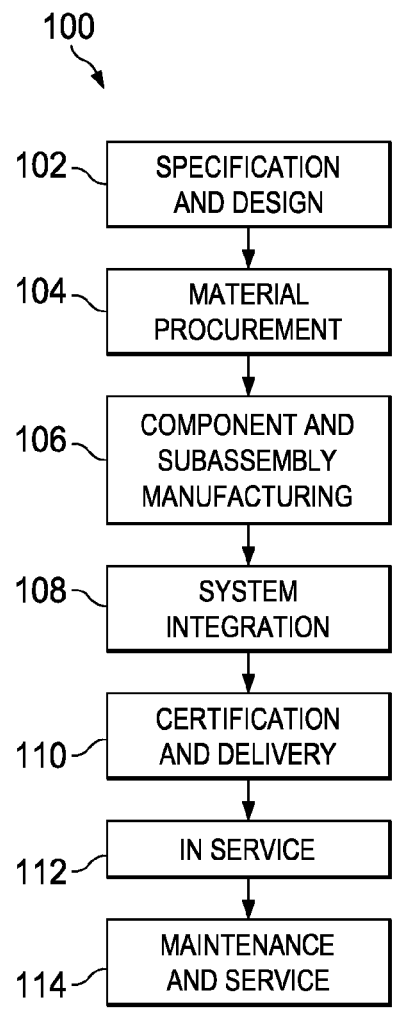
FIG. 1 is a flow diagram of an aircraft production and service methodology in accordance with an advantageous embodiment.
Figure 2:
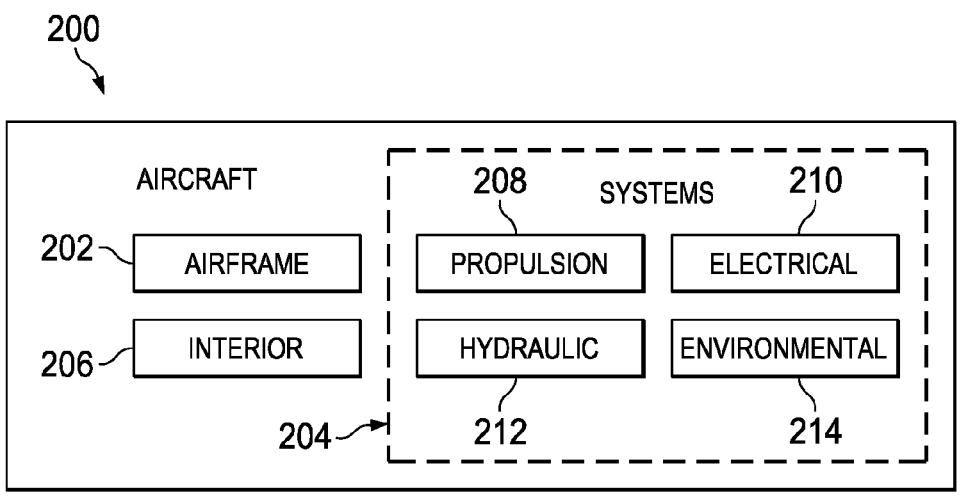
FIG. 2 is a block diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200.

Similarly, one or more of apparatus embodiments, method embodiments, or a combination thereof may be utilized while aircraft 200 is in service 112 or during maintenance and service 114 in FIG. 1. As a specific non-limiting example, one or more advantageous embodiments may be implemented during component and subassembly manufacturing 106 and/or during system integration 108 to provide electrical connections to moving parts in aircraft 200.

In the different advantageous embodiments, an apparatus for providing electrical contact may include a first part and a second part. The second part is movable relative to the first part. An electrical contact is attached to the second part in which the electrical contact provides an electrical connection between the first part and the second part when the second part is in a first position. The electrical connection is broken when the second part is in a second position. Additionally, the apparatus includes a relay electrically connected to the electrical contact. This relay may disconnect power from the electrical contact to prevent arcing when the electrical connection is broken.

Figure 3:
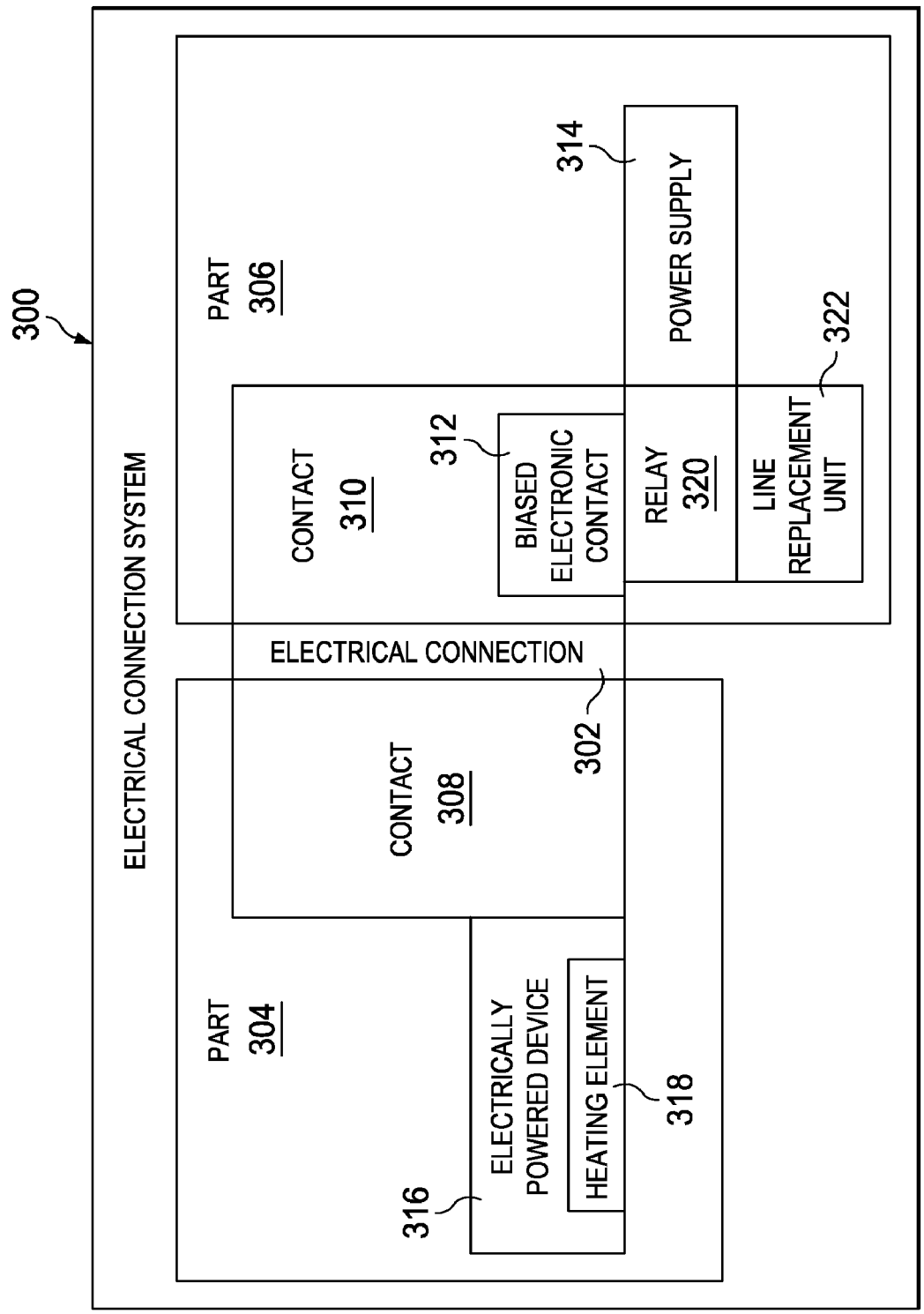
FIG. 3 is a diagram illustrating an electrical connection system in accordance with an advantageous embodiment.

With reference now to FIG. 3, a diagram illustrating an electrical connection system is depicted in accordance with an advantageous embodiment. Electrical connection system 300 may be implemented in various objects. For example, electrical connection system 300 may be implemented as a component or system within electrical system 210 for aircraft 200 in FIG. 2.

Electrical connection system 300 may provide electrical connection 302 between part 304 and part 306 through contact 308 and contact 310. Electrical connection 302 is present when contact 308 and contact 310 touch or contact each other sufficiently to allow for an electrical current to flow between contact 308 and contact 310. Contact 308 and contact 310 are electrical contacts in these examples. Further, contact 310 may take the form of biased electrical contact 312.

For example, part 304 may be a movable part that moves relative to part 306. Part 304 may be, for example, a slat or flap, while part 306 may be a wing of an aircraft. If part 304 moves relative to part 306, biased electrical contact 312 may continue to provide electrical contact 302 to contact 308 even though part 304 may have moved relative to part 306.

Biased electrical contact 312 may take various forms. For example, biased electrical contact 312 may be formed of a conductive medium in which a spring bias is located in the conduct medium. In other advantageous embodiments, a separate biasing component may be attached to a contact to form biased electrical contact 312. In other advantageous embodiments, biased contact 312 may be an electrical switch.

In other advantageous embodiments, contact 308 and contact 310 may be, for example, socket pin assemblies that connect to each other to form electrical connection 302. Of course, any type of contact system may be used in which electrical connection 302 may be formed between contact 308 and contact 310.

In this illustrative example, electrical connection 302 may provide electrical current from power supply 314 to electrically powered device 316. In these examples, electrically powered device 316 takes the form of heating element 318. Of course, electrically powered device 316 may take other forms. For example, electrically powered device 316 may be an electro-mechanical de-icing unit, a chemical de-icing unit, a light, a temperature sensor, a pressure sensor, an accelerometer, or some other suitable device that requires electrical power.

Electrical connection system 300 also may include relay 320. In this example, relay 320 connects power supply 314 to contact 310. Relay 320 provides a capability to minimize and/or prevent electrical arcing and/or sparking when contact 308 and contact 310 disconnect from each other. Relay 320 may take the form of an electrical switch that may open and close under the control of another electrical circuit or device.

In this example, relay 320 may be controlled by a component such as line replaceable unit 322. Line replaceable unit 322 may be, for example, a flight control module, a computer, a circuit, or some other device. In yet other advantageous embodiments, relay 320 may take the form of a mechanical switch, which may be controlled by movement of part 304. With this type of embodiment, relay 320 may disconnect contact 310 from power supply 314 prior to contact 308 and 310 being disconnected from each other to break electronic connection 302.

The illustration of electrical connection system 300 in FIG. 3 is not meant to imply physical or architectural limitations to the manner in which electrical connection system 300 may be implemented. For example, in other advantageous embodiments, relay 320 may connect electrical device 316 to contact 308 with a signal being sent to relay 320 through electrical connection 302 to disconnect power to electrically powered device 316.

In other advantageous embodiments, contact 308 may be a biased electrical contact instead of contact 310. In still other embodiments, both contacts may be biased electrical contacts. Alternatively, neither contact may be biased depending on the particular implementation.

Figure 4:
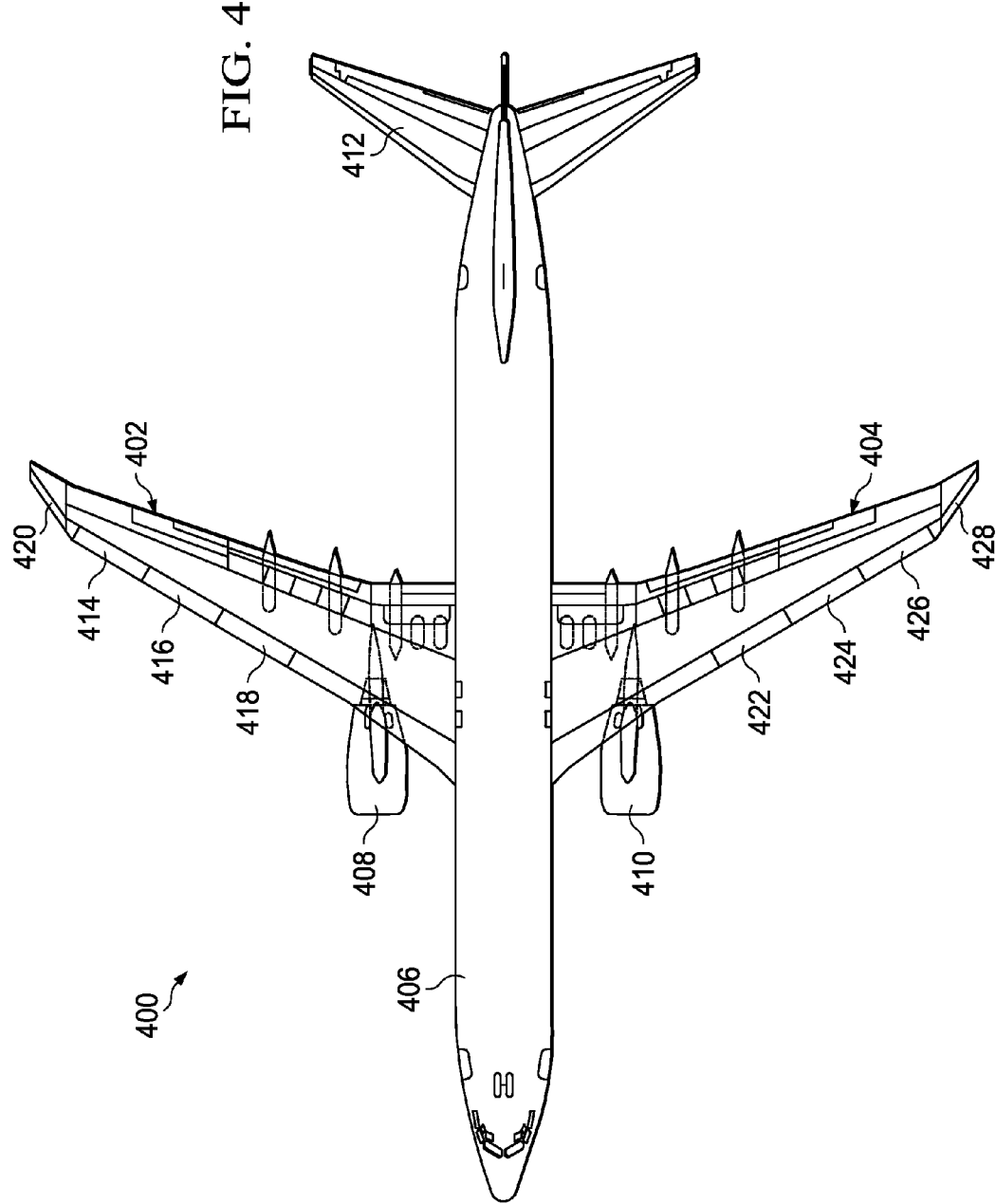
FIG. 4 is a diagram of an aircraft in accordance with an advantageous embodiment.

With reference now to FIG. 4, a diagram of an aircraft is depicted in accordance with an advantageous embodiment. Aircraft 400 is an example of one implementation for aircraft 200 in FIG. 2. Electrical connection system 300 in FIG. 3 may be implemented within aircraft 400 in these examples.

As illustrated, aircraft 400 has wings 402 and 404 attached to fuselage 406. Aircraft 400 also includes wing mounted engine 408, wing mounted engine 410, and tail 412. In these examples, wing 402 has control surfaces 414, 416, and 418 located on leading edge 420. Wing 404 has control surfaces 422, 424, and 426 on leading edge 428. These control surfaces may be examples of part 304, while the wings may be examples of part 306. These control surfaces may be, for example, slats or flaps. When a flap is located on a leading edge, the flap may be referred to as a Krueger flap.

The different advantageous embodiments provide a method and apparatus for supplying power to electrical devices that may be located within control surfaces 414, 416, 418, 422, 424, and 426 from wings 402 and 404. These electrical devices may be an example of electrically powered device 316 in FIG. 3. In this example, the electrical devices may take the form of heaters designed to prevent the buildup of ice as well as remove ice from the control surfaces.

Figure 5:
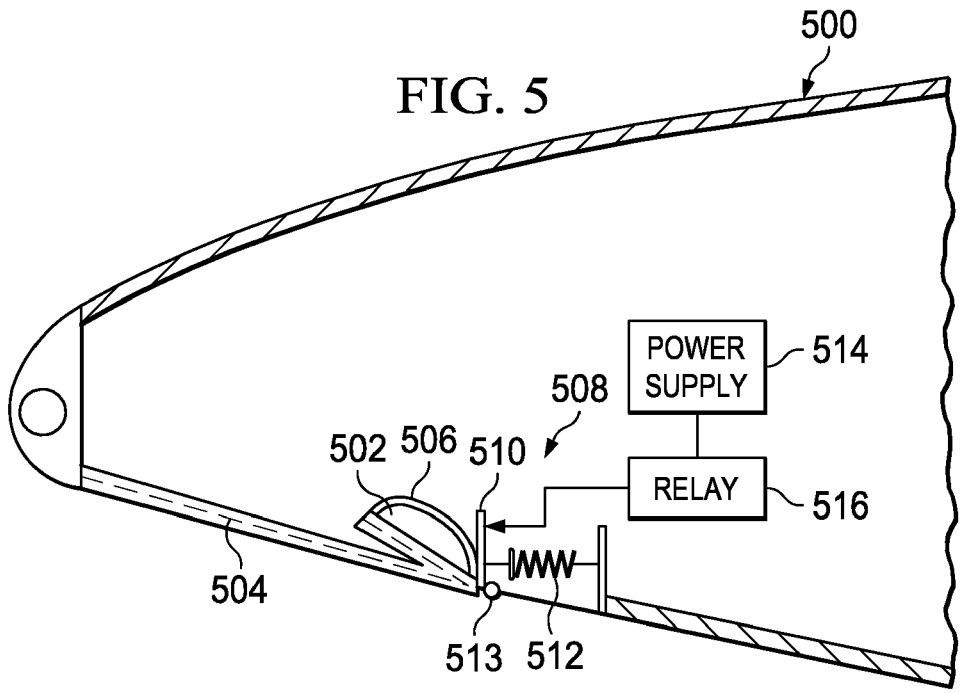
FIG. 5 is a cross section of a wing in accordance with an advantageous embodiment.

With reference now to FIG. 5, a cross section of a wing is depicted in accordance with an advantageous embodiment. In this example, wing 500 is an example of a portion of a wing, such as wing 404 in FIG. 4. In this illustration, only a portion of wing 500 is shown.

Krueger flap 502 of wing 500 includes heating element 504. Heating element 504 may generate heat to prevent and/or remove ice from Krueger flap 502. Additionally, Krueger flap 502 also has electrical contact strip 506, which is in contact with biased electrical contact 508.

Biased electrical contact 508 includes contact 510 and spring 512. Contact 510 may be biased and move about pivot 513. Biased electrical contact 508 is an example of a biasing mechanism that may be used to bias contact 510 towards electrical contact strip 506.

Electrical contact strip 506 is connected to power supply 514 through relay 516. Relay 516 controls power that is sent to heating element 504 on Krueger flap 502. Power supply 514 provides power for heating element 504 to generate heat.

Figure 6:
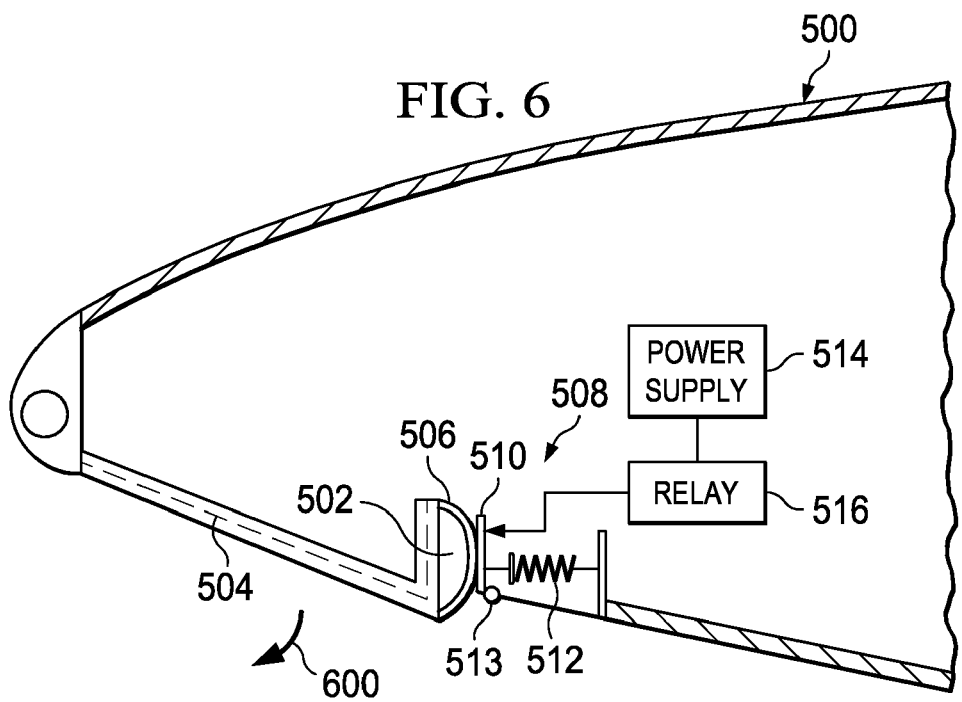
FIG. 6 is a diagram illustrating an aircraft wing in accordance with an advantageous embodiment.

With reference now to FIG. 6, a diagram illustrating an aircraft wing is depicted in accordance with an advantageous embodiment. In this example, Krueger flap 502 has begun to move in the direction of arrow 600. As can be seen in this example, biased electrical contact 508 is biased such that contact 510 remains in contact with electrical contact strip 506. Biased electrical contact 508 continues to provide an electrical connection such that power supply 514 supplies power to heating element 504.

With reference now to FIG. 7, a diagram of a wing is depicted in accordance with an advantageous embodiment. In this example, Krueger flap 502 has moved further in the direction of arrow 600. Electrical contact strip 506 contacts biased electrical contact 508 providing an electrical connection.

At this point, relay 516 disconnects biased electrical contact 508 from power supply 514. In these examples, relay 516 may be a mechanical relay in which movement disconnects relay 516 from contact 510 in biased electrical contact 508. In other advantageous embodiments, relay 516 may be an electrical switch that may be controlled by another device to break the electrical connection to power supply 514. The type of relay used may vary depending on the particular implementation.

Relay 516 breaks the electrical connection to cease supplying power to biased electrical contact 508 prior to biased electrical contact 508 disengaging or losing contact to electrical contract strip 506 on Krueger flap 502. This operation may be performed to minimize and/or prevent any arcing that could occur between electrical contact strip 506 and contact 510 if power was still being supplied through the electrical connection between electrical contact strip 506 and contact 510.

With reference now to FIG. 8, a Krueger flap is shown in a fully extended position in accordance with an advantageous embodiment. In this illustration, Krueger flap 502 has moved to a fully extended position. In this position, electrical contact strip 506 no longer contacts biased electrical contact 508 in a manner to create an electrical connection.

The deployment of Krueger flap 502 may be performed during the landing and/or takeoff of an aircraft. Once the aircraft is in flight, Krueger flap 502 may be retracted such that power may again be supplied to heating element 504.

Figure 9:
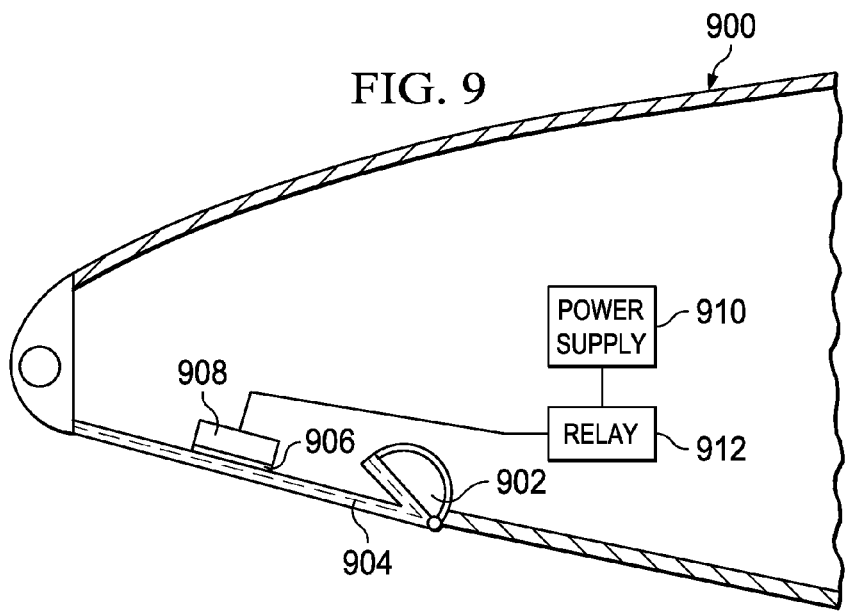
FIG. 9 is a diagram of a wing in accordance with an advantageous embodiment.

With reference now to FIG. 9, a diagram of a wing is depicted in accordance with an advantageous embodiment. In this example, wing 900 is a portion of a wing such as, for example, wing 404 in FIG. 4. In this example, wing 900 includes Krueger flap 902. Heating element 904 is present within Krueger flap 902. In this example, electrical contact strip 906 is located on Krueger flap 902 while biased electrical contact 908 is located on wing 900. Biased electrical contact 908 is connected to power supply 910 through relay 912.

Relay 912 may be an electrical switch that may control power sent from power supply 910 to biased electrical contact 908. Relay 912 may disconnect biased electrical contact 908 from power supply 910 prior to biased electrical contact 908 disconnecting from electrical contact strip 906. In this manner, arcing between these contacts may be reduced and/or prevented.

In this example, electrical contact strip 906 and biased electrical contact 908 may be implemented using various types of contact systems. For example, an automotive sliding door contact switch may be used to implement electrical contact strip 906 and biased electrical contact 908.

Figure 10:
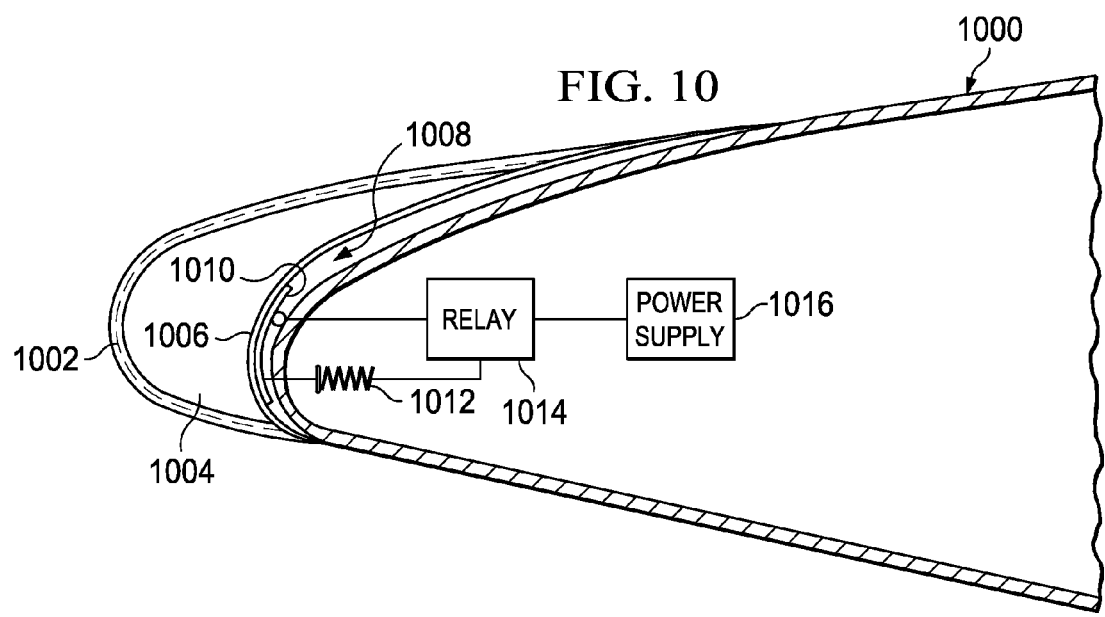
FIG. 10 is a cross section of a wing in accordance with an advantageous embodiment.

With reference now to FIG. 10, a cross section of a wing is depicted in accordance with an advantageous embodiment. In this example, wing 1000 is an example of a portion of a wing such as wing 404 in FIG. 4. In this illustration, only a portion of wing 1000 is depicted.

In this depicted example, wing 1000 includes slat 1002. Slat 1002 includes heating element 1004. When heating element 1004 is powered, heating element 1004 may be used to prevent the buildup of ice on slat 1002 as well as remove any ice from slat 1002 that may build up during flight when heating element 1004 is powered. Electrical contact strip 1006 is connected to heating element 1004.

Wing 1000 includes biased electrical contact 1008. In this example, biased electrical contact 1008 may include contact 1010 and spring 1012. Contact 1010 touches electrical contact strip 1006 to provide an electrical connection between these two contacts.

Spring 1012 biases contact 1010 against electrical strip 1006. Relay 1014 provides a connection to power supply 1016. Power supply 1016 supplies power to heating element 1004 through the electrical connection made between electrical contact strip 1006 and contact 1010 in biased electrical contact 1008.

Relay 1014 may be used to disconnect biased electrical contact 1008 from power supply 1016. In these examples, relay 1014 may be an electrical switch.

Figure 11:
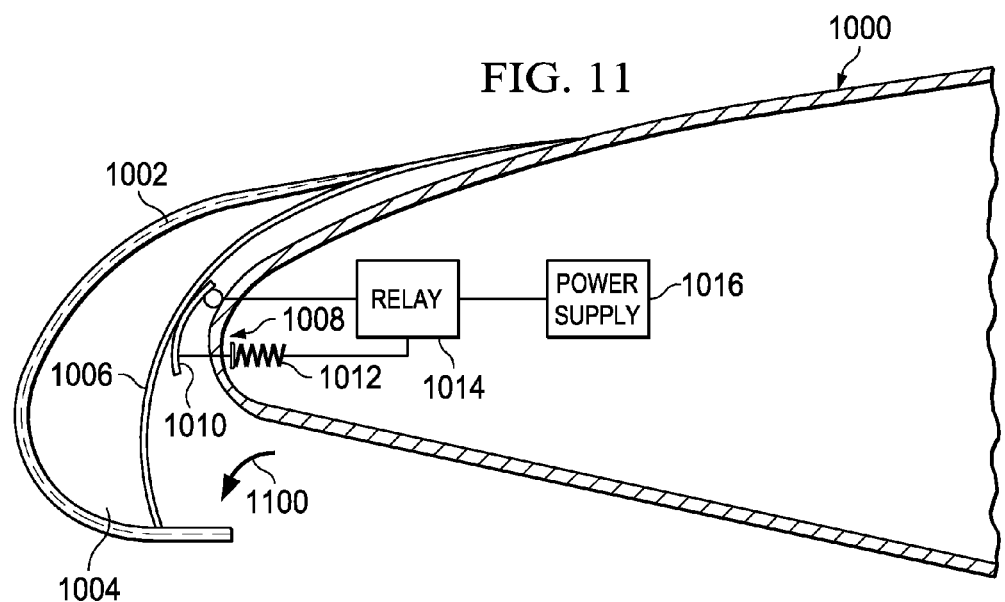
FIG. 11 is a diagram of a wing in accordance with an advantageous embodiment.

With reference now to FIG. 11, a diagram of a wing is depicted in accordance with an advantageous embodiment. In this illustrative example, slat 1002 has moved in the direction of arrow 1100. As can be seen, slat 1002 has moved forward and downward with respect to wing 1000. Through this movement, contact 1010 maintains contact with electrical contact strip 1006 in a manner in which an electrical contact may be present. Spring 1012 biases contact 1010 towards electrical contact strip 1006. Further, with this movement, electrical contact strip 1006 may slide with respect to contact 1010. In this manner, power may be maintained to heating element 1004 in slat 1002.

Figure 12:
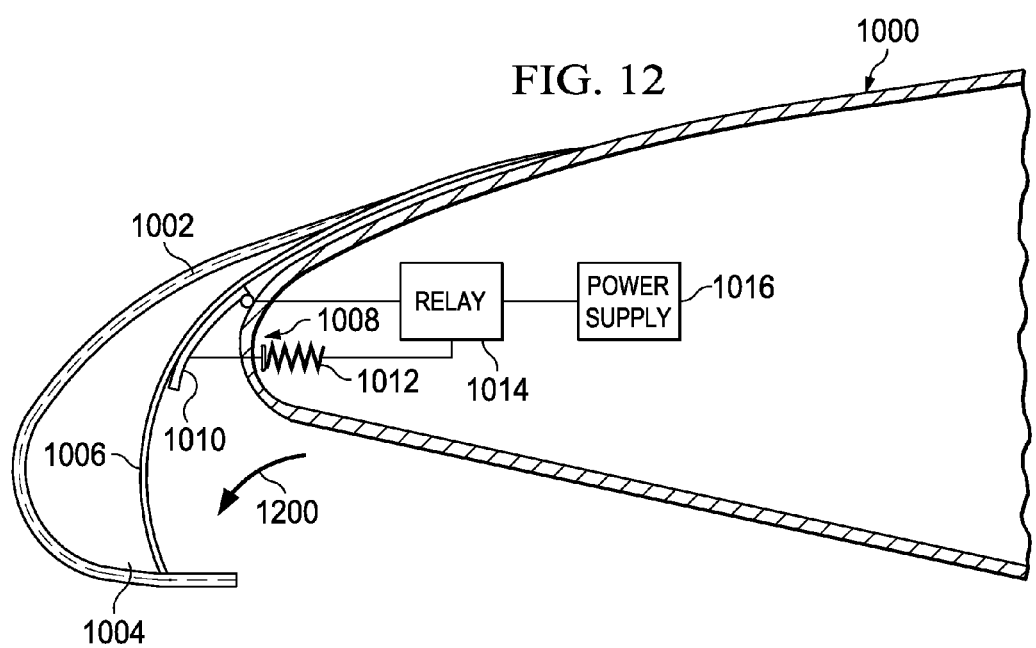
FIG. 12 is a diagram of a wing in accordance with an advantageous embodiment.

With reference now to FIG. 12, a diagram of a wing is depicted in accordance with an advantageous embodiment. As can be seen in this example, slat 1002 has moved in the direction of arrow 1200 to a fully deployed position. Contact 1010 is still in contact with electrical contact strip 1006 with spring 1012 biasing contact 1010 towards electrical contact strip 1006. As can be seen, electrical contact strip 1006 has slid with respect to contact 1010, but maintains an electrical contact. With this type of implementation, relay 1014 may provide power to heating element 1004 only when heat is desired.

Figure 13:
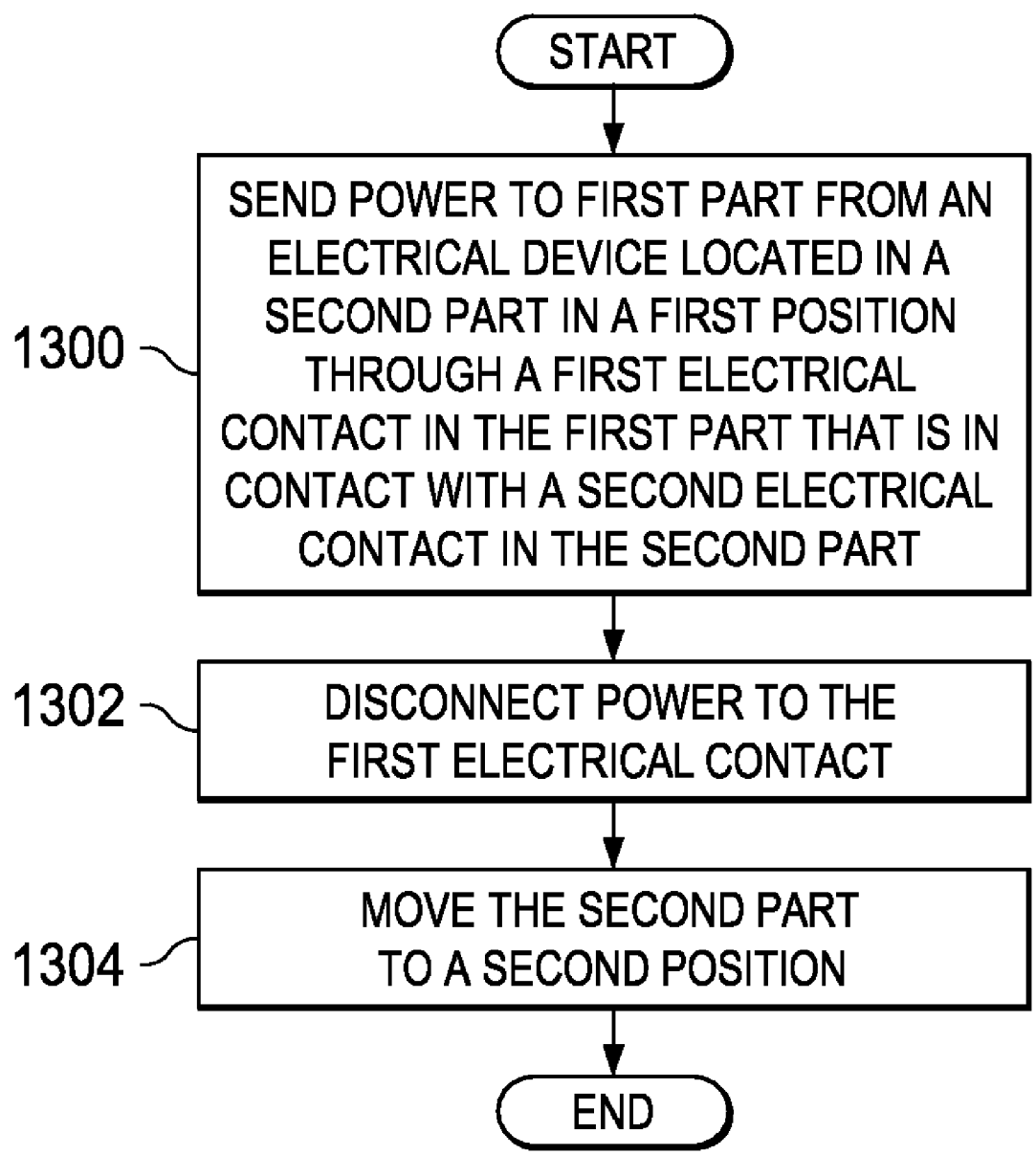
FIG. 13 is a flowchart of a process for supplying power to a device in a moving part in accordance with an advantageous embodiment.

With reference now to FIG. 13, a flowchart of a process for supplying power to a device in a moving part is depicted in accordance with an advantageous embodiment. In these examples, the process illustrated in FIG. 13 may be implemented using an electrical connection system such as electrical connection system 300 in FIG. 3. In particular, the different operations illustrated in this figure may be implemented to control power supplied to a heating element in the wing of an aircraft such as aircraft 400 in FIG. 4.

The process begins by sending power from a first part to an electrical device located in a second part in a first position through a biased electrical contact (operation 1300). This biased electrical contact provides an electrical connection between the first part and the second part with the second part in the first position.

The process then disconnects the power to the first electrical contact (operation 1302). Operation 1302 may be implemented using a relay. By disconnecting power to the electrical contact, arcing may be minimized and/or prevented when the contacts disengage from each other.

The process then moves the second part to a second position in which the first electrical contact disconnects from the second electrical contact (operation 1304), with the process terminating thereafter. This process may be reversed to again supply power to the electrical device located in the second part.

Thus, the different advantageous embodiments provide a method and apparatus for supplying power to an electrical device located in a moving part. In the different advantageous embodiments, a first and second part may be present in which the second part is movable relative to the first part. An electrical contact is attached to or located in or on the second part. The electrical contact provides an electrical connection between the first part and the second part when the second part is in the first position and breaks the electrical connection when the second part is in a second position.

Further, a relay may be electrically connected to the electrical contact. The relay may be used to cease sending power or breaking the electrical connection to the electrical contact prior to the first and second part moving such that the electrical connection is broken.

With these and other features in the different advantageous embodiments, the need or use of complex wiring systems may be avoided. As a result, weight and space savings may be obtained when using an advantageous embodiment, such as the one illustrated, rather than current mechanisms such as translating wire bundles.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for providing power to a heating element in a moveable portion of an aircraft wing rotatably connected to the aircraft wing, comprising:
 a first part flexibly attached to the moveable portion and having a conductive surface for transmitting power to the heating element;
 a second part pivotally connected to the aircraft wing and biased by a spring for contact with the first part, wherein the second part is an electrical contact movable relative to the first part and is removably connected to a power supply by a relay when the second part is in a first position;
 wherein, when the moveable portion rotates about a pivot, the first part rotates about the moveable portion so that the conductive surface of the first part maintains a contact with the second part as the conductive surface slides over the electrical contact of the second part; and
 wherein the first part breaks contact with the relay only during the passage of a portion of the conductive surface over the electrical contact so that the current from the power supply stops flowing to the heating element before the first part disengages from the second part.

2. The apparatus of claim 1, wherein the moveable portion is selected from one of a leading edge slat and a leading edge flap.

3. The apparatus of claim 1, wherein the electrical contact comprises:
 a socket pin assembly.

4. The apparatus of claim 1, wherein the relay is capable of disconnecting power from the electrical contact to prevent arcing when the electrical connection is broken.

5. The apparatus of claim 1, wherein the electrical contact comprises:

a biased electrical contact having a flat surface that engages the conductive surface having a first end and a second end, the conductive surface connected to the first part by the first end and the second end, and the conductive surface being curved between the first end and the second end.

6. The apparatus of claim 5, wherein the biased electrical contact comprises:
a conductive medium; and
a spring biasing the conductive medium.

7. The apparatus of claim 1 further comprising:
an object, wherein the first part and the second part are part of the object.

8. The apparatus of claim 7, wherein the object is selected from one of a mobile platform, a stationary platform, a land-based structure, an aquatic-based structure, a space-based structure, an aircraft, a surface ship, a tank, a train, a personnel carrier, a spacecraft, a submarine, an automobile, a power plant, a manufacturing facility, and a building.

9. An aircraft electrical connection system comprising:
a wing of an aircraft;
a movable part on a leading edge of the wing;
a heater located within the movable part;
a contact strip connected to an inside of the movable part and to the heater;
a biased electrical contact rotatably engaged to the wing by a pivot and moveably engaged to the contact strip, wherein the biased electrical contact provides an electrical connection between the heater and a power supply in the wing when the movable part is in a first position in relation to the wing and maintains the electrical connection continuously while the movable part moves to a second position in relation to the wing.

10. The aircraft electrical connection system of claim 9, wherein the movable part is selected from one of a slat and a flap.

11. The aircraft electrical connection system of claim 9 further comprising: a relay connecting the biased electrical contact to a power supply, wherein the electrical connection breaks when the movable part moves to a third position.

12. The aircraft electrical connection system of claim 9, wherein the biased electrical contact maintains the electrical connection during all positions of the movable part.

13. A method for providing an electrical connection to moving vehicle parts, the method comprising:
sending power from a first part to an electrical device located in a second part through a biased electrical contact moveably engaged to an unbiased contact in the second part, wherein the biased electrical contact maintains the electrical connection between the first part and the second part through a relay electrically connected to the biased electrical contact;
moving the second part from a first position to a second position, wherein the biased electrical contact continuously maintains moveable engagement with the unbiased contact while the second part moves from the first position to the second position but disconnects from the relay prior to the second part reaching the second position,
wherein electrical arcing is prevented.

14. The method of claim 13, wherein the electrical device is a heater element.

15. The method of claim 14, wherein the first part is selected from one of a flap and a slat.

16. The method of claim 15, wherein the second part is a wing of an aircraft.

17. The method of claim 16 further comprising:
moving the first part into the second position during takeoff of the aircraft.

18. The method of claim 16 further comprising:
moving the first part into the second position during landing of the aircraft.

* * * * *